No. 839,583. PATENTED DEC. 25, 1906.
F. W. HAVLICEK.
LIQUID MEASURE.
APPLICATION FILED SEPT. 7, 1906.
2 SHEETS—SHEET 1.
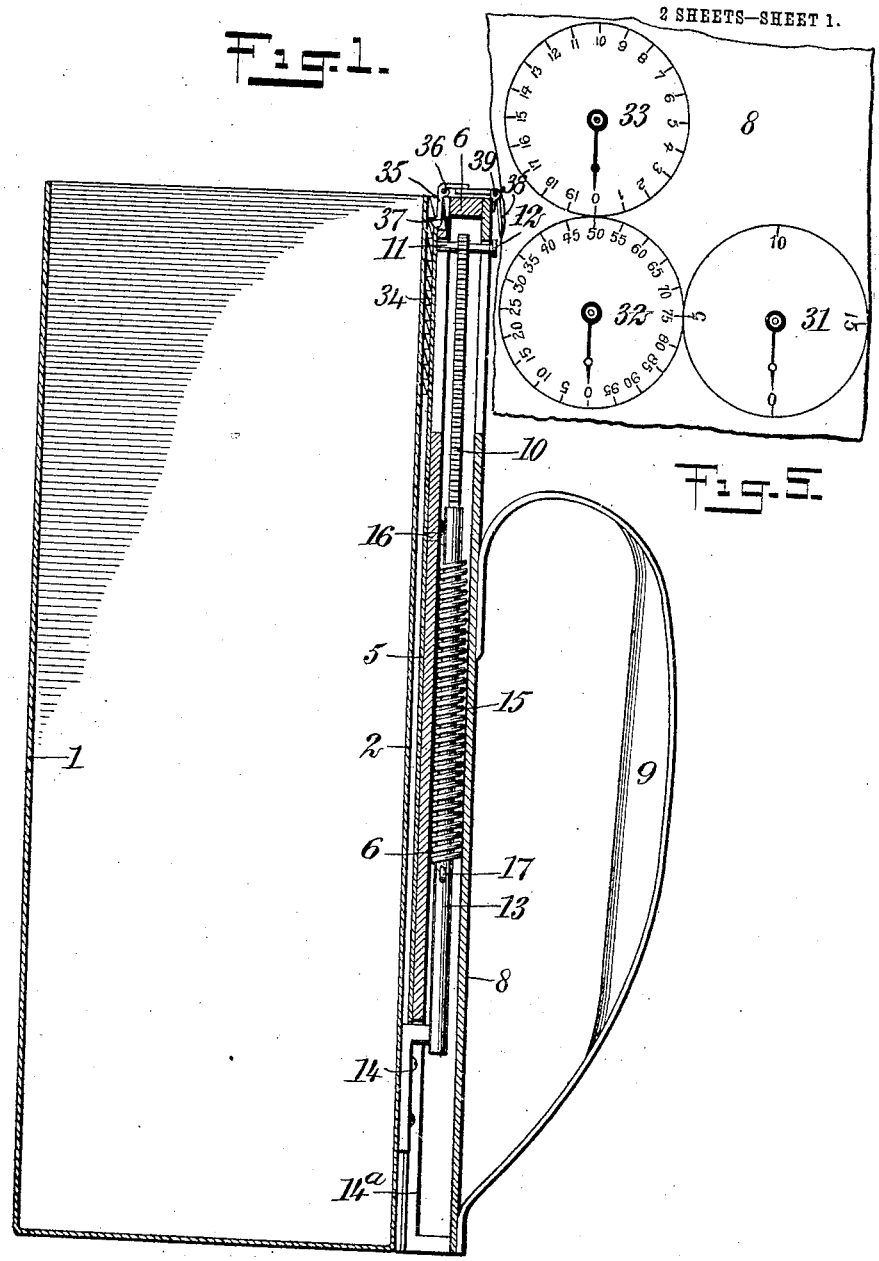
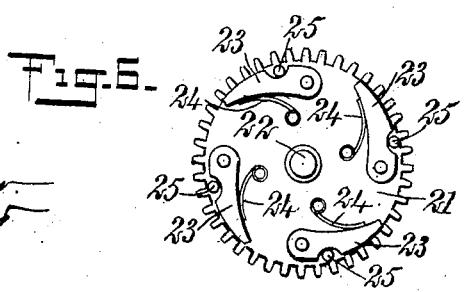
WITNESSES
INVENTOR
Frank W. Havlicek
BY
ATTORNEYS No. 839,583.
PATENTED DEC. 25, 1906.
F. W. HAVLICEK.
LIQUID MEASURE.
APPLICATION FILED SEPT. 7, 1906.
2 SHEETS—SHEET 2.
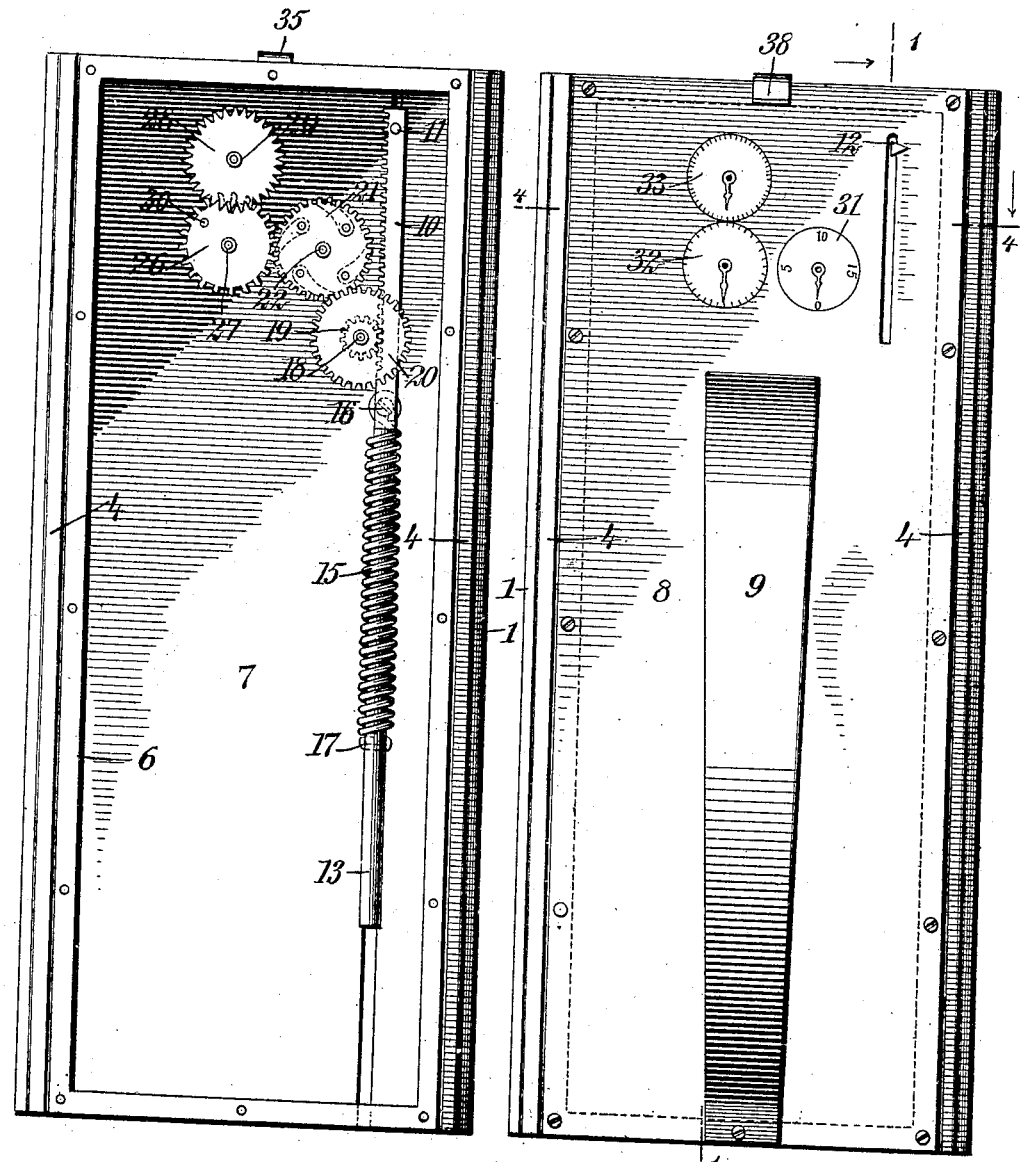
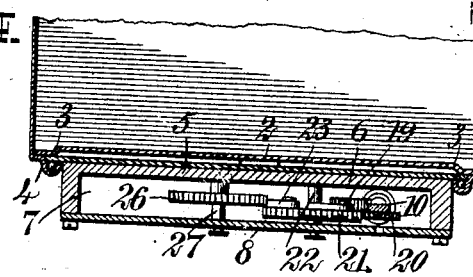
WITNESSES
INVENTOR
Frank W. Havlicek
BY
ATTORNEYS

UNITED STATES PATENT OFFICE.

FRANK W. HAVLICEK, OF TWIN FALLS, IDAHO.

LIQUID-MEASURE.

No. 839,583.  Specification of Letters Patent.  Patented Dec. 25, 1906.

Application filed September 7, 1906. Serial No. 333,599.

*To all whom it may concern:*

Be it known that I, FRANK W. HAVLICEK, a citizen of the United States, and a resident of Twin Falls, in the county of Cassia and State of Idaho, have invented a new and Improved Liquid-Measure, of which the following is a full, clear, and exact description.

This invention is an improvement in liquid-measures designed to measure liquids and automatically indicate the weight thereof and also to automatically indicate the price and register the same.

One embodiment of the invention consists of a cup having a guide at one side thereof in which is slidably mounted a block cut out on one face, providing a chamber, and a handle connected to a plate and inclosing said chamber. A spring mounted in the chamber operates on a rack-bar through the weight of liquid therein and moves a system of gears that automatically indicate and register the price, and a pointer rigidly connected to the rack-bar automatically indicates the weight of the liquid.

Reference is to be had to the accompanying drawings, forming a part of this specification, in which similar characters of reference indicate corresponding parts in all the figures.

Figure 1 is a vertical section of the measure, showing the parts when the measure is empty and in normal position, said section being taken substantially on the line 1 1 of Fig. 3 looking in the direction of the arrow. Fig. 2 is an elevational view at right angles to Fig. 1 with the handle and detached plate removed. Fig. 3 is a view similar to Fig. 2 with the handle and its detached plate secured in place. Fig. 4 is a fragmentary transverse sectional view substantially on the line 4 4 of Fig. 3 looking in the direction of the arrow. Fig. 5 is a fragmentary view, on an enlarged scale, of the outer plate containing the dials and pointers for indicating the price of the liquid; and Fig. 6 is an inside elevation of a gear forming a detail of construction.

Referring to the drawing figures, the numeral 1 indicates a cup, pail, or the like of suitable capacity and of any desired outward formation, that shown being substantially square in cross-section. One side of the pail is formed by a plate 2, offset at 3 at each side, which in conjunction with the inturned offset edges 4 of each side of the cup forms guideways for slidably containing a plate 5. Secured to the plate 5 and extending its entire length, which is the length of the cup, is a block 6, slightly narrower in width and cut out on its outer face, providing a chamber 7, the latter being normally closed by a plate 8, attached to the edges of the block by screws or any suitable devices and having fixed to the exterior thereof a suitable handle 9.

A rack-bar 10 has fixed to its upper end a transverse pin 11, the ends of which are slidably mounted in longitudinal slots provided in the rear face of the block 7 and the plate 8, respectively, a pointer 12 being carried at the end of the pin 11 at the outside of the plate 8 and is adapted to traverse graduations thereon marked in pounds and fractional parts thereof. The lower end of the rack-bar 10 is connected to a rod 13, which is preferably an integral part thereof and is connected at its lower extremity with a bracket 14, attached to the plate 2 of the cup. A slot $14^a$ is provided in the plate 5 and block 6, adapting the bracket to slide therein. A spiral spring 15 surrounds the rod 13 and is attached at its upper end to the block 6 by a screw 16 and is connected at its lower end to the rod by passing the extremity of the spring through an aperture therein, as indicated at 17.

Journaled in the block 6 and plate 8 is a pin 18, having fixed thereto a small gear 19 in mesh with the rack-bar 10 and a larger gear 20 at one side thereof in mesh with a gear 21 of the same size and fixed to a pin 22, also journaled in the block and plate. The gear 21 is provided on its inner face with four pivoted dogs 23, equally spaced apart and pressed outwardly by springs 24, engaging their inner faces. Stop-pins 25 at the periphery of the gear limit their outward movement. A gear 26, fixed to a pin 27, journaled in the block and plate, is adapted to be engaged by the points of the dogs 23 as the gear 21 revolves, thereby turning the gear 26 one tooth for each one-quarter revolution of the gear 21.

A gear 28 is fixed to a pin 29, journaled in the block and plate, and is adapted to be moved one tooth for each revolution of the gear 26 by a pin 30, fixed thereto. The ends of the pins 18, 27, and 29 are extended beyond the face of the plate 8, where suitable hands or pointers are connected to them, traversing dials 31, 32, and 33, respectively.

The dial 31 is graduated to indicate up to twenty cents. The dial 32 is graduated to indicate up to one dollar, and the remaining dial 33 is graduated to indicate up to twenty dollars, the graduations of each of the dials being in multiples of five.

For preventing any relative movement between the cup and handle as the cup is being filled or emptied a rack 34 is fixed to the upper end of the plate 2 and is normally engaged by a pawl 35, pivoted at 36 to the block 6 and forced in such engagement by a spring 37. For operating this pawl a thumb-lever 38, bell-crank in character, is pivoted at 39, with its inner arm passing under the tail of the pawl, as best shown in Fig. 1.

Assuming the parts of the measure to be in the position shown in Fig. 1, on measuring out a quantity of liquid in the cup the thumb-lever 38 is pressed to disengage the pawl 35, which transmits the weight of the liquid through the bracket 14 and rod 13 to the spring 15, drawing the rack-bar 10 downwardly and revolving the system of gears and also the hands or pointers traversing the dials 31, 32, and 33, indicating the price thereof and at the same time automatically indicating the weight of the liquid by the pointer 12. When the liquid is poured from the cup, the spring brings the pointer traversing the dial 31 back to the zero-point; but the pointers traversing the dials 32 and 33 remain stationary, since the dogs 23, attached to the gear 21, yield and do not engage the teeth of the gear 26 on the return movement. It is thus seen that the pointers of the dials 32 and 33 record the price of the total amount of liquid dispensed.

I have described the invention in detail in order that the construction and operation might be fully understood. It is, however, evident that various immaterial changes may be made therein, and I consider that I am entitled to such modifications as fall within the scope of the annexed claims.

Having thus described my invention, I claim as new and desire to secure by Letters Patent—

1. The combination of a cup, a member slidable at one side thereof provided with a chamber, a rack-bar attached to the cup and inclosed by the chamber, a spring attached to the rack-bar and to the sliding member, and a gear mechanism journaled in the chamber, operable by the rack-bar, to indicate the price of the contents of the cup.

2. The combination of a cup, a slidable member having a chamber at one side thereof, a bar fixed to the cup and mounted in the chamber, a spring connected to the bar and to the slidable member, and a pointer carried by the bar adapted to indicate the weight of the contents of the cup.

3. The combination of a cup, a member slidably mounted at one side thereof, a plurality of gears carried by the slidable member having pointers fixed thereto for indicating the price of the contents of the cup, means fixed to the cup for operating the gears, and an intermediate gear having spring-pressed dogs for engaging the teeth of one of said gears.

4. The combination of a cup, a member slidably mounted at one side thereof, a plurality of gears carried by the slidable member having pointers to indicate the price of the contents of the cup, means fixed to the cup for operating the gears to move the pointers in one direction, and means adapting some of said pointers to remain stationary when the means fixed to the cup is moved in the opposite direction.

5. The combination of a cup, a chambered member slidably mounted at one side thereof, a plurality of gears journaled in the chamber carrying pointers to indicate the price of the contents of the cup, means connected to the cup for operating the gears, and means for preventing the turning of one of said pointers in one direction.

6. The combination of a cup, guideways carried by the cup, a chambered member slidably mounted in the guideways, a handle attached to the chambered member, a plurality of gears journaled in the chamber carrying pointers to indicate the price of the contents of the cup, a rack-bar meshing with one of said gears and connected to the cup, and a spring attached to the slidable member and to the rack-bar.

In testimony whereof I have signed my name to this specification in the presence of two subscribing witnesses.

FRANK W. HAVLICEK.

Witnesses:
O. A. STALKER,
J. M. ROGERS.